United States Patent
Fu et al.

(10) Patent No.: US 11,080,975 B2
(45) Date of Patent: Aug. 3, 2021

(54) THEFT PROOF TECHNIQUES FOR AUTONOMOUS DRIVING VEHICLES USED FOR TRANSPORTING GOODS

(71) Applicants: Baidu USA LLC, Sunnyvale, CA (US); Baidu.com Times Technology (Beijing) Co., Ltd., Beijing (CN)

(72) Inventors: Yiqun Fu, Beijing (CN); Liangliang Zhang, San Jose, CA (US); Shengxiang Liu, Beijing (CN); Jiangtao Hu, Sunnyvale, CA (US)

(73) Assignees: BAIDU USA LLC, Sunnyvale, CA (US); BAIDU.COM TIMES TECHNOLOGY (BEIJING) CO, LTD., Beijing (CN)

( * ) Notice: Subject to any disclaimer, the term of this patent is extended or adjusted under 35 U.S.C. 154(b) by 545 days.

(21) Appl. No.: 16/074,081

(22) PCT Filed: Jun. 29, 2018

(86) PCT No.: PCT/CN2018/093744
§ 371 (c)(1),
(2) Date: Jul. 30, 2018

(87) PCT Pub. No.: WO2020/000396
PCT Pub. Date: Jan. 2, 2020

(65) Prior Publication Data
US 2021/0183221 A1    Jun. 17, 2021

(51) Int. Cl.
*G08B 13/196*        (2006.01)
*B60R 25/102*        (2013.01)
*B60R 25/31*         (2013.01)
*B60R 25/30*         (2013.01)

(52) U.S. Cl.
CPC ...... *G08B 13/19647* (2013.01); *B60R 25/102* (2013.01); *B60R 25/31* (2013.01); *G08B 13/19613* (2013.01); *B60R 25/305* (2013.01)

(58) Field of Classification Search
CPC .............................................. G08B 13/19647
See application file for complete search history.

(56) References Cited

U.S. PATENT DOCUMENTS

2017/0136989 A1* 5/2017 Haber ................. B60R 25/1003
2021/0039513 A1* 2/2021 Konrardy ............. G05D 1/0293

* cited by examiner

*Primary Examiner* — Travis R Hunnings
(74) *Attorney, Agent, or Firm* — Womble Bond Dickinson (US) LLP

(57) ABSTRACT

Various techniques for theft proofing autonomous driving vehicles (ADV) for transporting goods are described. In one embodiment, sensor data of a moving object representing a person within a predetermined proximity of an ADV are captured for real-time analysis by a theft detection module, to determine a moving behavior of the moving object based on the sensor data in view of a set of known moving behaviors. The theft detection module further determines whether an intention of the person is likely to remove at least some of the goods from the ADV using a process derived from historical image set, and sends an alarm to a predetermined destination in response to determining such an intention of the person. Other sensor data, for example, real time movements and weights of the ADV, can be used in conjunction with the process derived from historical image sets to determine the intention of the person.

20 Claims, 7 Drawing Sheets

THEFT PROOF TECHNIQUES FOR AUTONOMOUS DRIVING VEHICLES USED FOR TRANSPORTING GOODS

CROSS-REFERENCE TO RELATED APPLICATION

This patent application is a U.S. National Phase Application under 35 U.S.C. § 371 of International Application No. PCT/CN2018/093744, filed Jun. 29, 2018, entitled "THEFT PROOF TECHNIQUES FOR AUTONOMOUS DRIVING VEHICLES USED FOR TRANSPORTING GOODS," which is incorporated by reference herein by its entirety.

TECHNICAL FIELD

Embodiments of the present disclosure relate generally to operating autonomous driving vehicles. More particularly, embodiments of the disclosure relate to theft proof techniques for autonomous driving vehicles used for transporting goods.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicles operating in an autonomous mode (or autonomous driving vehicles (ADV)) can be used for transporting goods, for example, delivering groceries to individual households. ADVs used for such purpose typically are small in size, and tend to be unmanned as they make their ways through city and suburban streets.

As such, ADVs for goods delivery are prone to thefts. For example, goods can be removed from the ADVs by unintended persons; even a whole ADV can be taken away.

However, not everyone approaching and moving near such an ADV is to commit a theft. A person that appears near an ADV may simply be a human obstacle. Sending alarms without differentiating people according to their behaviors can be disturbing to the surroundings, and put unnecessary burdens on people who are tasked with responding to the alarms. Therefore, there is a need for techniques that can be used to effectively detect theft behaviors.

SUMMARY

In a first aspect, the present disclosure provides a computer-implemented method for theft proofing an autonomous driving vehicle, including: receiving, by a theft detection module from a plurality of sensors, sensor data of a moving object representing a person within a predetermined proximity of the ADV for transporting goods, wherein the sensor data includes a plurality of images of the moving object, and real-time weights and movements of the ADV; determining a moving behavior of the moving object based on the sensor data in view of a set of known moving behaviors; determining whether an intention of the person is likely to remove at least some of the goods from the ADV based on the moving behavior; and sending an alarm to a predetermined destination in response to determining that the intention of the person is likely to remove the at least a portion of the goods from the ADV.

In a second aspect, the present disclosure provides a non-transitory machine-readable medium having instructions stored therein, which when executed by a processor, cause the processor to perform the above method in the first aspect.

In a third aspect, the present disclosure provides a system, including a processor; and a memory coupled to the processor to store instructions, which when executed by the processor, cause the processor to perform the above method in the first aspect.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
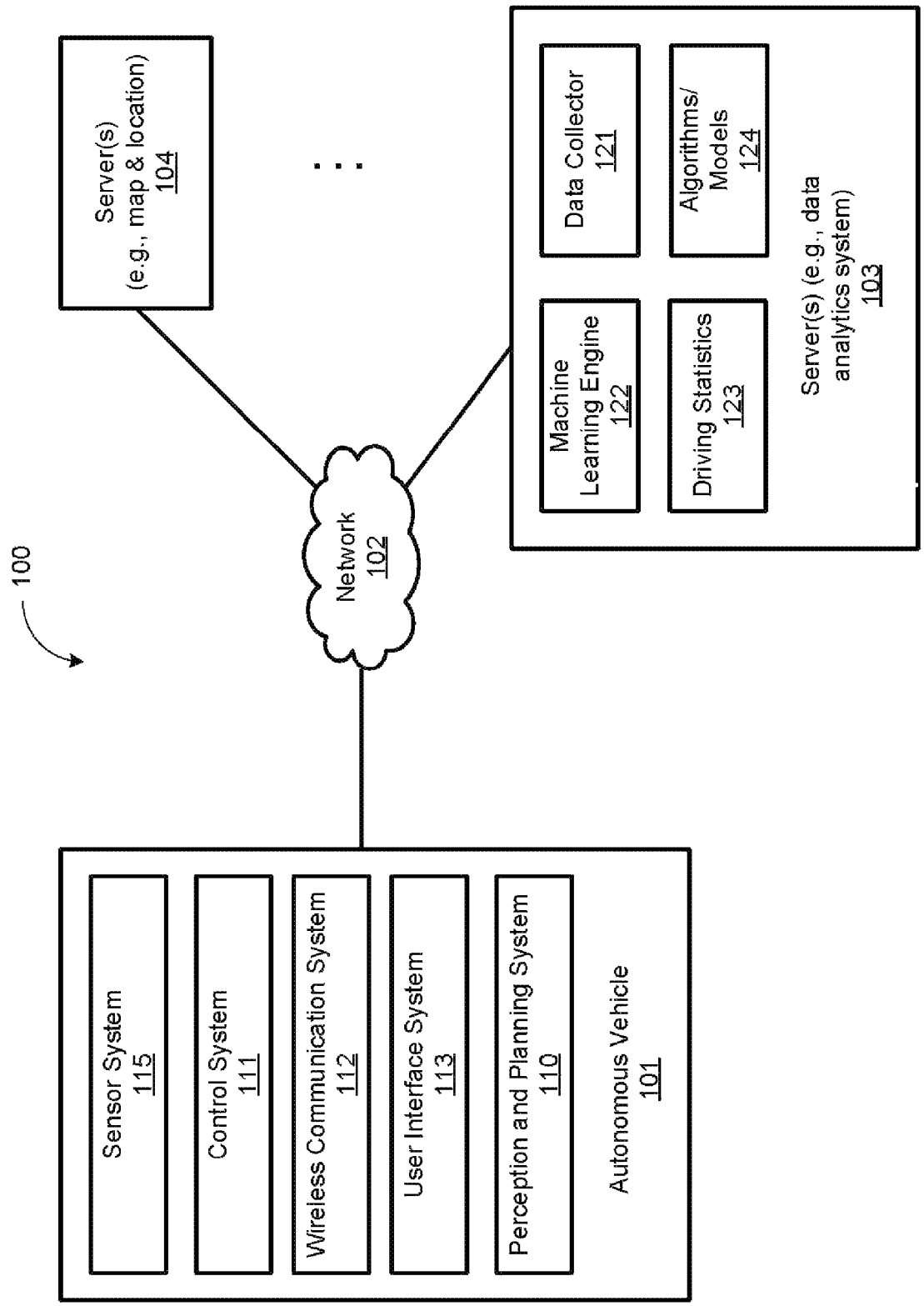
FIG. 1 is a block diagram illustrating a networked system according to some embodiments.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment may be included in at least one embodiment of the disclosure. The appearances of the phrase "in one embodiment" in various places in the specification do not necessarily all refer to the same embodiment.

According to various embodiments, described herein are systems and methods for theft proofing autonomous driving vehicles (ADV), particularly those ADVs used for transporting goods.

In one embodiment, a theft proofing system includes various sensors and a theft detection module. The theft detection module receives sensor data of a moving object from the sensors, the moving object representing a person within a predetermined proximity of an ADV. The theft detection module analyzes the sensor data in real-time to determine a moving behavior of the moving object based on the sensor data in view of a set of known moving behaviors. The theft detection module further determines whether an intention of the person is likely to remove at least some of the goods from the ADV using a process derived from historical image set, and sends an alarm to a predetermined destination in response to determining such an intention of the person.

In one embodiment, the set of known moving behaviors can be represented by one or more image sets stored in a database, where each image set represents a known human behavior. In determining the moving behavior of the moving object, the theft detection module compares each image set of the moving object against those image sets stored in the database. If a match is found, the theft detection module can determine that the person possesses a moving behavior that needs further analysis.

In one embodiment, the database stores a set of known theft records that represent a blacklist of persons who committed at least one theft. The blacklist includes personal data and at least a face image for each person in the blacklist.

The sensor data can include a face image of the person within the predetermined proximity of the ADV. A match between the face image in the sensor data and a face image in the blacklist indicates that the person committed at least one theft (e.g., theft of goods from an ADV) before.

In one embodiment, after identifying the moving behavior of the moving object for further analysis and monitoring, the theft detection module can use an algorithm or process derived from training historical image sets, which are labeled "theft" and "non-theft." Each of those image sets labeled "theft" represents a human theft behavior, and each of those image sets labeled "non-theft" represents a human non-theft behavior. The image sets training can be performed by a machine learning engine running on a remote server.

In one embodiment, one or more of other indicators can be in combination with the process derived from historical image sets, to determine the intention of the moving object. The other indicators can include: a person being in the blacklist, a loss of weight of the ADV exceeding a predetermined threshold (e.g., 1 kilogram) since the person appeared within the predetermined proximity of the ADV, and an erratic movement of the ADV indicating that the ADV is likely to be taken away.

In alternative embodiments, if the person is in the blacklist or the weight of the ADV has decreased by more than a predetermined threshold, the theft detection module can determine that the person is likely to steal goods from the ADV without using the process derived from historical image sets, and can send an alarm to the predetermined destination immediately.

The ADV can log each and every moving behavior of moving objects within a predetermined proximity, for use by a machine learning engine to determine moving behaviors of moving objects, e.g., persons, and to optimize the process used to determine intentions of the moving objects.

Embodiments of the disclosure described herein use persons as examples of moving objects. It would be appreciated that various embodiments of the disclosure can be used to detect theft behaviors, or potential theft behaviors of other moving objects, e.g., robots.

Autonomous Driving Vehicles

FIG. 1 is a block diagram illustrating an autonomous vehicle network configuration according to some embodiments of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles may be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
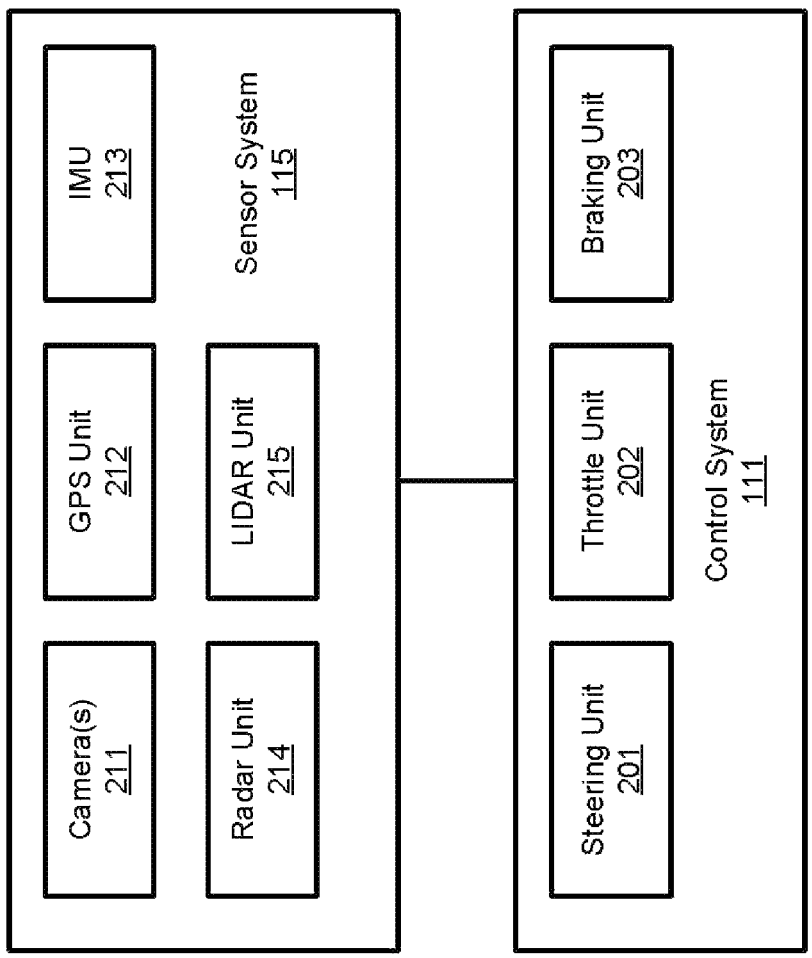
FIG. 2 is a block diagram illustrating an example of an autonomous vehicle according to some embodiments.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In some embodiments, the perception and planning system 110 may not have MPOI information (e.g., map data). For example, the perception and planning system 110 may not have map data for other environments or geographical areas/locations, the perception and planning system 110 may not have map data for an environment or geographical area/location where the autonomous vehicle 101 is currently travelling or located (e.g., the perception and planning system 110 may have map data for one city but may not have map data for another city). In another example, the perception and planning system 110 may not have any map data or MPOI information (e.g., the perception and planning system 110 may not store any map data).

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. In one embodiment, driving statistics further include certain behaviors or movements of people captured by the sensors such as cameras. Some of those people may commit theft or attempt to commit theft of goods or the vehicles.

Based on driving statistics 123, machine learning engine 122 generates or trains a set of rules, algorithms, and/or predictive models 124 for a variety of purposes. In one embodiment, machine learning engine 122 may generate or train a set of theft detection rules, algorithms, or predictive models 124 based on the driving statistics 123 to determine or predict whether the behaviors of a particular person may indicate the person will likely commit theft. The algorithms 124 may be generated or trained based on a set of known behaviors of known thefts collected in the past. The theft detection algorithms 124 can then be uploaded to ADVs, such as a part of theft detection algorithms 313 as shown in FIG. 3A, which can be utilized in real-time to detect any person approaching an ADV may have the likelihood of removing goods from the ADV.

Figure 3A:
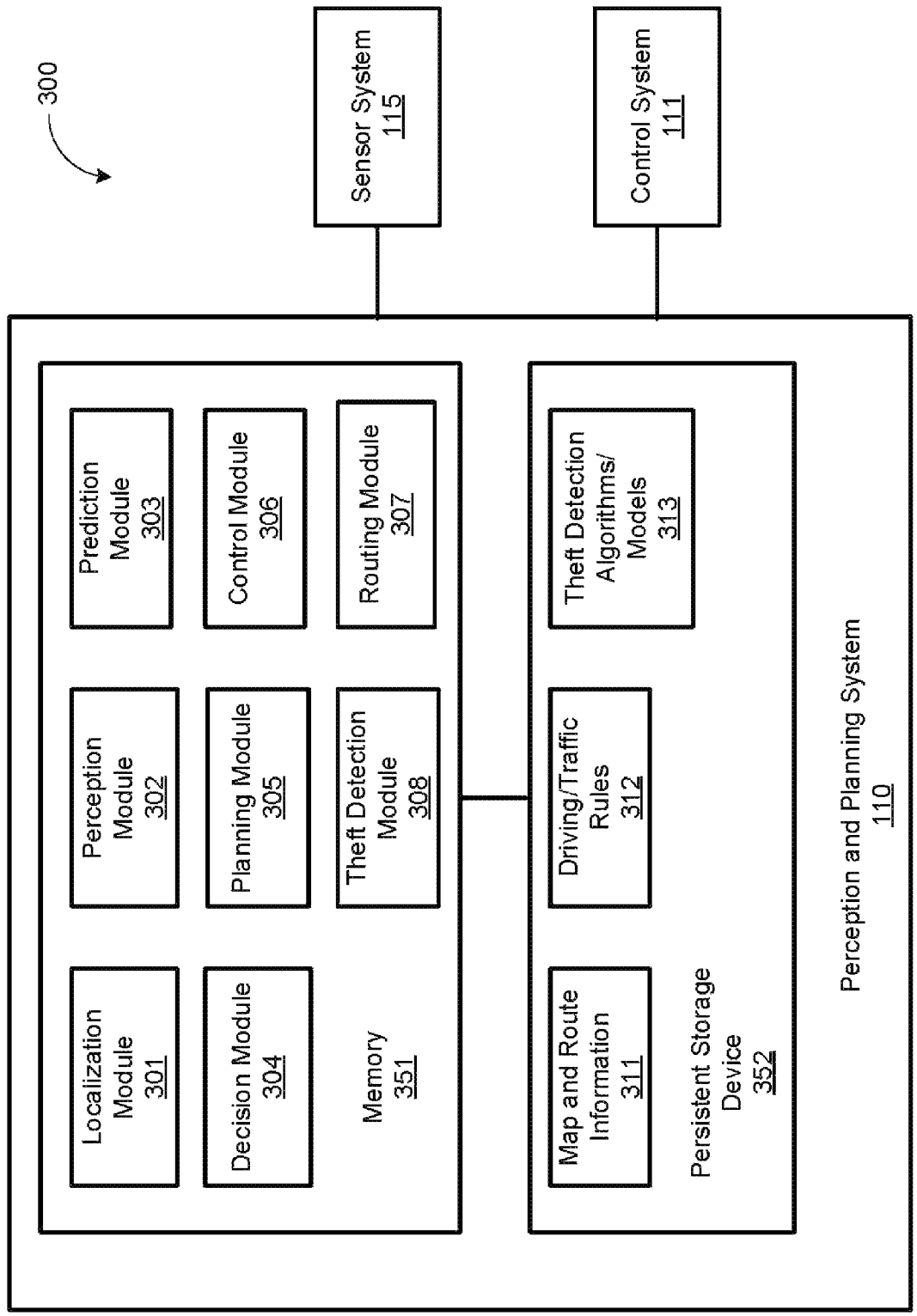
FIGS. 3A-3B are block diagrams illustrating an example of a perception and planning system used with an autonomous vehicle according to some embodiments.
Figure 3B:
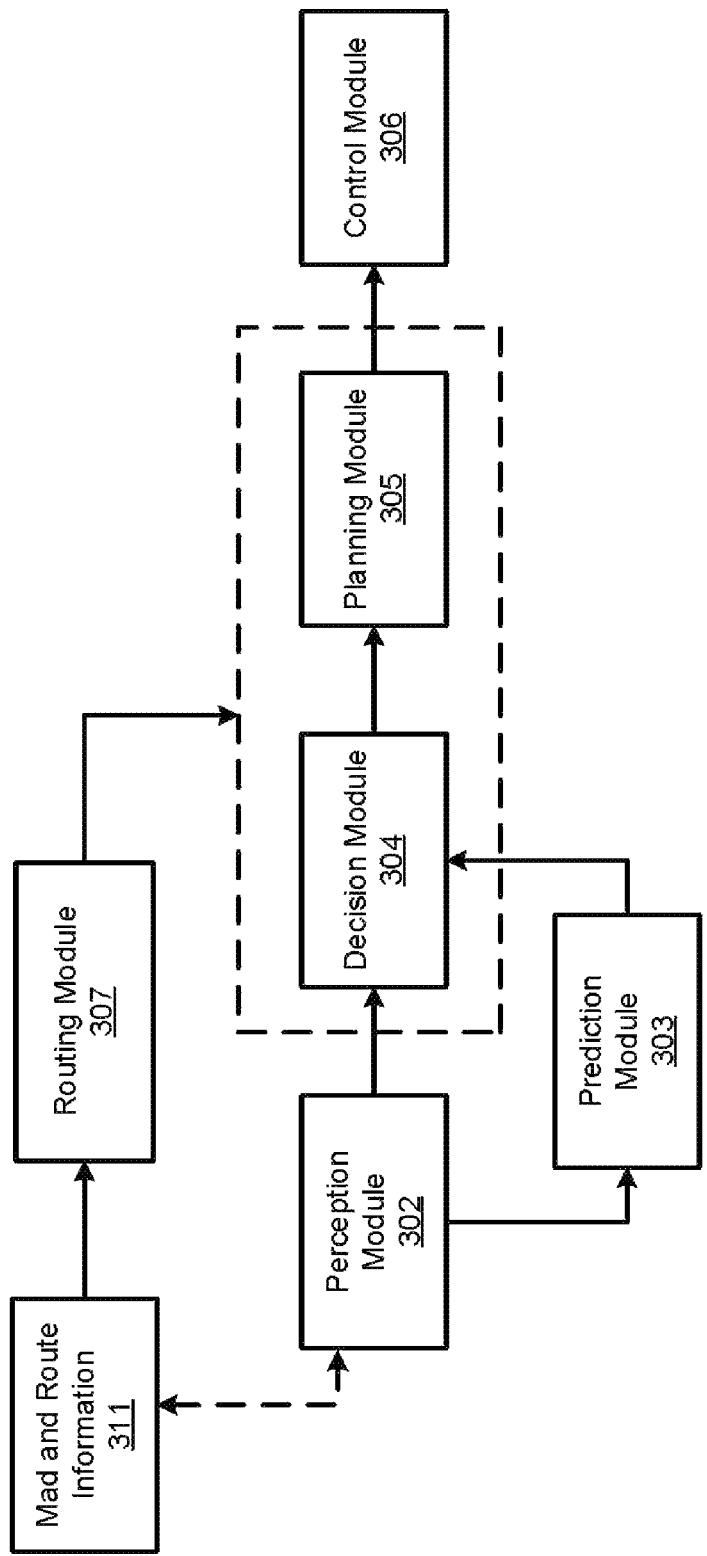

FIGS. 3A and 3B are block diagrams illustrating an example of a perception and planning system used with an autonomous vehicle according to some embodiments. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and theft detection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server. In one embodiment, the map and route information 311 may have been previously stored in the persistent storage device 352. For example, the map and route information 311 may have been previously downloaded or copied to the persistent storage device 352.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively. In some embodiments, the map/route information 311 for an environment or geographical area/location may be generated on the fly (e.g., generated by the perception module 302) as the autonomous vehicle travels through the environment or geographical area/location, as discussed in more detail below.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Various moving obstacles/objects may move unpredictably. For example, although a pedestrian may be moving along a path, the pedestrian may suddenly change direction (e.g., turn left) or may accelerate/decelerate. This may cause problems when attempting to predict the path of the moving object in order to avoid colliding with, hitting, or striking the moving object. Thus, it may be useful to determine (e.g., calculate, compute, obtain, etc.) an area that includes possible locations where a moving obstacle may move to. This may allow the ADV to increase the probability of avoiding the moving obstacle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. In some embodiments, the map/route information 311 may be generated by the perception module 302, as discussed in more detail below. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps (which may be generated by the perception module 302 or may have been previously stored/downloaded) so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc., in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference routes, for example, from map information such as information of road segments, vehicular lanes of road segments, and distances from lanes to curb. For example, a road may be divided into sections or segments {A, B, and C} to denote three road segments. Three lanes of road segment A may be enumerated {A1, A2, and A3}. A reference route is generated by generating reference points along the reference route. For example, for a vehicular lane, routing module 307 can connect midpoints of two opposing curbs or extremities of the vehicular lane provided by a map data (which may be generated by the perception module 302 or may have been previously stored/downloaded). Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

Based on reference points or lane reference points, routing module 307 may generate a reference line by interpolating the reference points such that the generated reference line is used as a reference line for controlling ADVs on the vehicular lane. In some embodiments, a reference points table and a road segments table representing the reference lines are downloaded in real-time to ADVs such that the ADVs can generate reference lines based on the ADVs' geographical location and driving direction. For example, in one embodiment, an ADV can generate a reference line by requesting routing service for a path segment by a path segment identifier representing an upcoming road section ahead and/or based on the ADV's GPS location. Based on a path segment identifier, a routing service can return to the ADV reference points table containing reference points for all lanes of road segments of interest. ADV can look up reference points for a lane for a path segment to generate a reference line for controlling the ADV on the vehicular lane.

Theft detection module 308 can be configured to analyze sensor data collected by sensor system 115, and detect whether a person within a predetermined proximity of the ADV is a human obstacle or a person that intends to commit a theft from the ADV or take away the whole ADV. Theft detection module 308 may perform the theft detection based on person's behaviors using a set of theft detection algorithms or theft predictive models 313.

Theft Proof System

Figure 4:
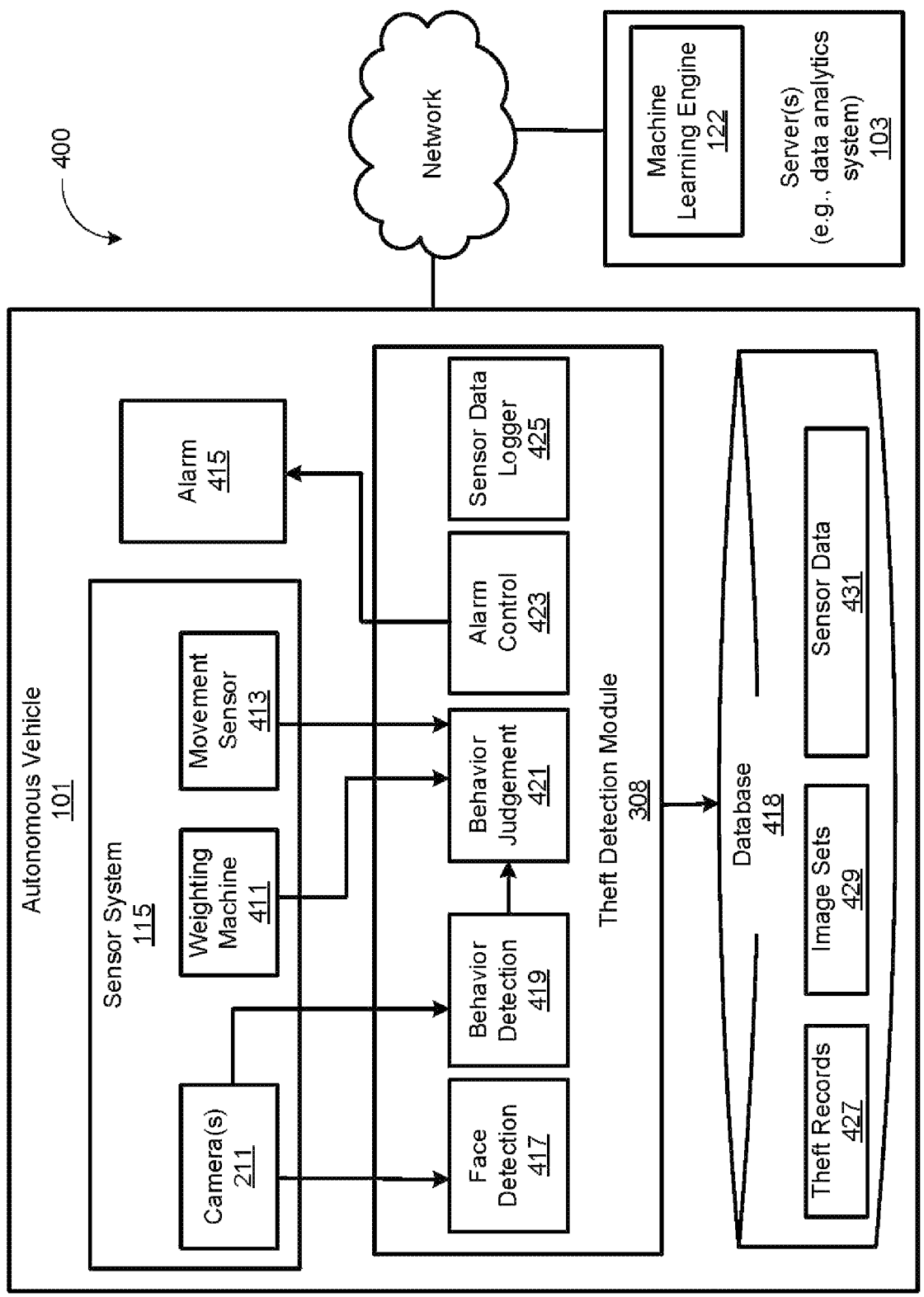
FIG. 4 illustrates an example theft proof system in an ADV for transporting goods according to one embodiment.

FIG. 4 illustrates an example theft proof system in an ADV for transporting goods according to one embodiment. As shown in FIG. 4, theft proof system 400 can be provided in ADV 101. In one embodiment, ADV 101 can be used to transport goods, for example, from wholesalers to retailers or from grocery stores to individual households.

In one embodiment, theft proof system 400 can include sensor system 115, alarm 415, theft detection module 308, and database 418. Sensor system 115 can include a number of sensors, for example, one or more cameras 211, weighting machine 411 (e.g., pressure sensors), and movement sensor 413 (also referred to as motion sensors such as accelerometers, IMU).

Cameras 211 can be configured to capture data of moving objects (e.g., persons) within a predetermined proximity of the ADV. The captured data can be in a variety of formats, including digital images, videos, and audios. The predetermined proximity can be configured based on one or more of factors, including the needs of the owner of the ADV, surroundings in which the ADV typically operates, and activities of moving objects previously captured by the ADV and similar ADVs operating in the same area. For example, cameras can be configured to capture data from a moving object within 5 meters of the ADV.

Weighting machine 411 can be installed in ADV 101, and can detect weights of the ADV in real time. For example, weighting machine 411 may include one or more pressure sensors disposed at various locations of the ADV to detect the weight changes of the ADV. Movement sensor 413 can detect movements of the ADV in real time, such as accelerometers. The real-time data in movements or weights of the ADV can be used alone or in conjunction with the data captured by cameras 211, to detect potential theft behaviors of moving objects within a predetermined proximity of the ADV.

Alarm 415 can be a peripheral device installed in the ADV to make loud sounds and send a report to a predetermined destination. In one embodiment, alarm 415 can include an alarming horn for making loud sounds. Alarm 415 can be connected to a network interface, so that data related to each alarm can be sent to an alarm response center. The data related to each alarm can include the face image of the moving object (e.g., a person), images sets related to the theft behavior, and GPS signals indicating a location where the theft behavior occurs. When alarm 415 detects erratic movements of the ADV, e.g., movements indicating that the whole ADV is being taken away, GPS signals and images can be continuously sent through a network to the alarm response center.

In one embodiment, database 418 can be used to store different types of data, including store theft records 427, image sets 429, and captured sensor data 431. Each type of data can be stored in one or more tables. Theft records 427 can represent a blacklist including persons who committed at least one theft. The blacklist includes personal data and at least a face image for each person in the blacklist. Image sets 429 can include one or more image sets describing moving behaviors of persons, which may be configured as a part of theft detection rules or algorithms 313. Sensor data 431 can include all sensor data captured by the sensors within a predefined period of time, for example, during the past 6 months.

In one embodiment, sensor data 431 can be used to update image sets 419, and can also be used by machine learning engine 122 to create an algorithm for detecting a likely behavior or optimize an existing algorithm for such purpose, which may be utilized to update the theft detection algorithms or models 124 or algorithms 313.

Tables storing theft records 427 and image sets 429 can be synchronized with a remote database at a configurable interval, so that the theft records 427 and image sets 429 can be updated with newly generated theft records and image sets from other ADVs operating in one or more predefined areas.

As shown in FIG. 4, theft detection module 308 can include various modules including face detection module 417, behavior detection module 419, behavior judgement module 421, alarm control module 423, and sensor data logger module 425. Each of the modules can be a software module executing on a computing device within the ADV. In one implementation, the computer device can be an Industrial Personal Computer (IPC) with a Linux operating system installed thereon. Alternatively, at least some of the modules 417-425 may be implemented in hardware or firmware. Alto note that some or all of these modules can be integrated in fewer modules or single module dependent upon the specific applications.

Cameras 211 can be used to provide sensor data for use by face detection module 417 and behavior detection module 419. Face detection module 417 can preprocess image data of a person and search for a match for face features of the person in the backlist. If a match is found, a flag can be sent to alarm control module 423, which can prompt alarm 415 to send an alarm immediately, or wait for one or more additional indicators of theft before instructing alarm 415 to send an alarm. Behavior detection module 419 can use captured image sets of a person to determine whether there is a match between a captured image set and an image set in image sets 429 in database 418. An image set match indicates that the person has performed a moving behavior that needs further analysis.

In one embodiment, after such a moving behavior is detected, behavior judgment module 421 can use a process or algorithm derived from training historical image sets, to determine whether the person is likely to steal at least a portion of the goods from the ADV based on the moving behavior. In one embodiment, a set of features may be extracted from the images and/or other sensor data (e.g., pressure sensor data, accelerometer data). The features may be fed into a theft predictive model to determine whether such a behavior is associated with a predetermined theft behavior. The theft predictive or determination model may have been trained using a set of known theft behaviors in the past.

As an illustrative example, if the moving behavior of the person identified for further analysis is represented by an image set showing the person approaching the ADV empty-handed and leaving the ADV with an item of goods in his/her hands, the algorithm or process used by behavior judgement module 421 would determine that the person intends to remove at least a portion of goods from the ADV.

In one embodiment, one or more additional indicators can be used alone, or in conjunction with the algorithm or process, to determine the intention of the person based on the moving behavior.

For example, if subsequent to the detection of the moving behavior of a person for further analysis, behavior detection module 419 receives real time data of weights from weighting machine 411 indicating a weight loss of the ADV that exceeds a predetermined threshold, behavior detection module 421 can determine that the person intends to remove at least a portion of goods from the ADV, and can instruct alarm control module 423 to send an alarm. In addition, an alarm message may be transmitted to a centralized facility, such as a law enforcement facility or an organization that operates the ADV.

In one embodiment, other indicators that can be used for determining the likely theft intention of the person include:

the person being in the blacklist, and an erratic movement of the ADV indicating that the ADV is likely to be taken away. For example, if a person approaches the vehicle with a non-committal manner, i.e., looking or walking around while slowly approaching the vehicle, the person may not be an owner or authorized person of the vehicle. On the other hand, if the person walks straight up approaching the vehicle, that particular person may be an owner or authorized person. Such behavior can be utilized in view of other actions performed by the person to determine whether such an action is associated with a theft action.

In some situations, a person removing the goods from the vehicle may not be a theft. The person may be an authorized person to offload the goods from the vehicle. The theft detection system may not solely rely on the fact that someone has removed the goods. The determination has to be performed in view of all of the behavioral data captured under the circumstances. The behaviors of a person may be determined by extracting a set of features from the images capturing the actions or movements of the person. An analysis may be performed on the features to generate a conclusion. In one embodiment, the extracted set of features may be fed into a theft predictive model generated by a machine-learning engine to predict whether such behaviors would likely commit a theft action. As described above, the theft predictive model may be trained and generated based on a large amount of training data of committed theft offline using a machine-learning engine such as machine-learning engine 122.

Figure 5:
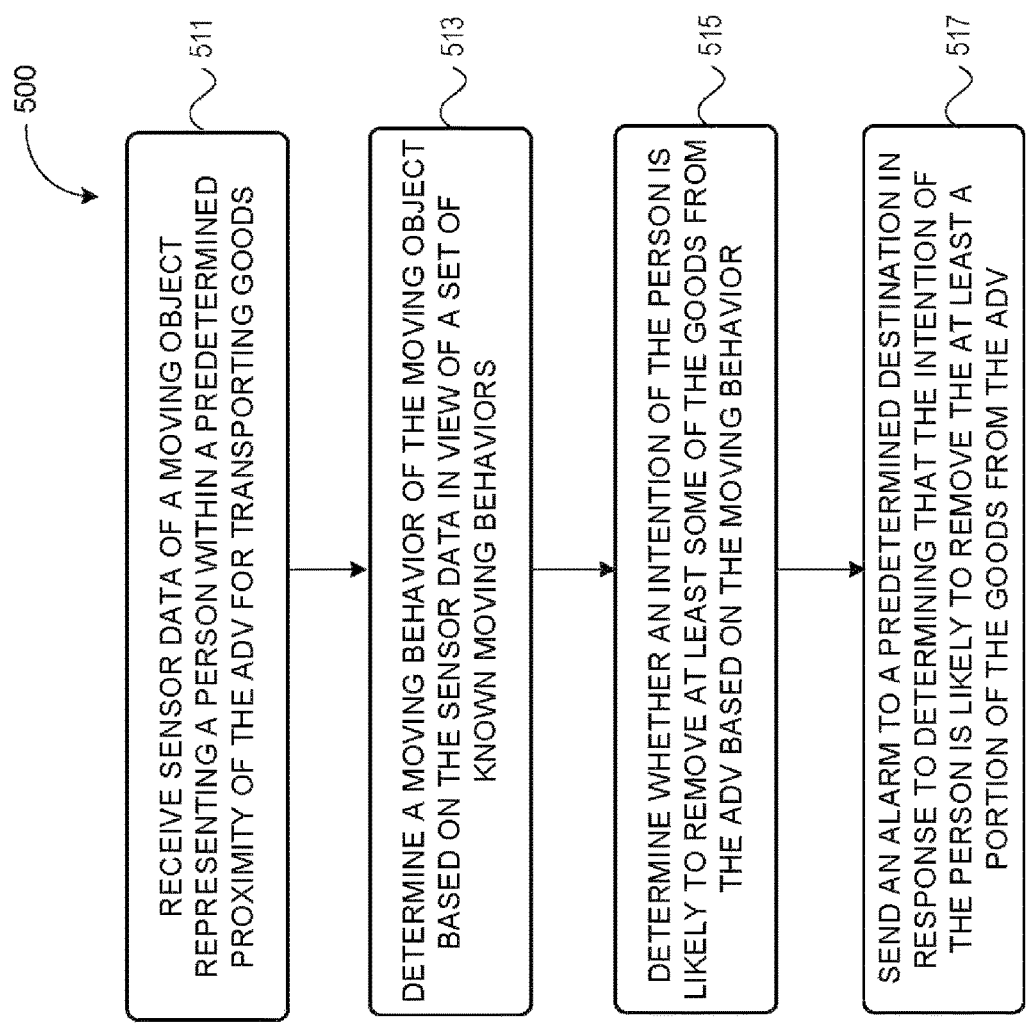
FIG. 5 illustrates an example process for theft proofing an ADV for transporting goods according to one embodiment.

FIG. 5 illustrates an example process for theft proofing an ADV for transporting goods according to one embodiment. Process 500 may be perform by processing logic which may include software, hardware, or a combination thereof. The process 500 illustrated by FIG. 5 can be performed by the example theft proof system described in FIG. 4, such as, for example, theft detection module 308.

As shown in FIG. 5, in operation 511, a theft detection module in an ADV receives, from a number of sensors, sensor data of a moving object representing a person within a predetermined proximity of the ADV for transporting goods. The sensor data can include a sequence of images of the moving object captured by the sensors.

In operation 513, the theft detection module determines a moving behavior of the moving object based on the sensor data in view of a set of known moving behaviors. The moving behavior indicates that the moving object has performed a moving behavior that needs further analysis. When determining the moving behavior, the theft detection module can search a match between an image set in the sensor data and one or more image sets stored in a database, where the images sets represent the set of known behaviors. The database is synchronized with a remote database for updated information at a configurable fixed time interval.

In operation 515, with the detection of the moving behavior that indicates the person has performed a moving behavior for further analysis, the theft detection module determines whether an intention of the person is likely to remove at least some of the goods from the ADV based on the moving behavior. In determining such an intention, the theft detection module can use an algorithm or process derived from training historical image sets that are classified into "theft" and "non-theft" images sets. Alternatively, the theft detection module can use one or more additional indicators, which include: a person being in the blacklist, a significant weight loss of the ADV, and/or an erratic movement of the ADV that indicates that the ADV is likely to be taken away.

In operation 517, the theft detection module instructs an alarm control module to send an alarm to a predetermined destination in response to determining that the intention of the person is likely to remove the at least a portion of the goods from the ADV.

Figure 6:
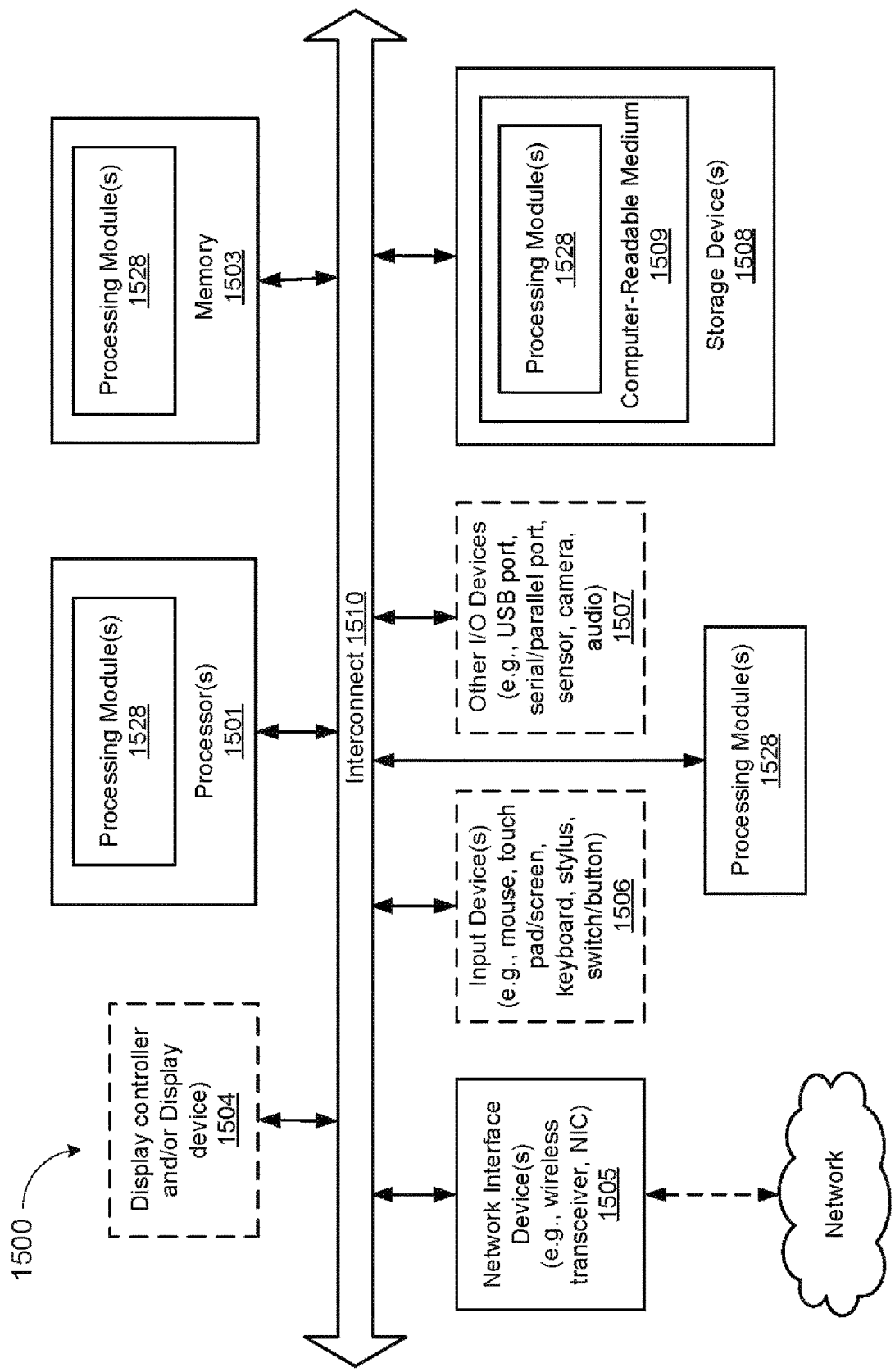
FIG. 6 is a block diagram illustrating a data processing system according to some embodiments.

FIG. 6 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor may be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment may be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications may be loaded in memory 1503 and executed by processor 1501. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and/or theft detection module 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein may be implemented as discrete hardware components or integrated in the functionality of hardware components such as ASICS, FPGAs, DSPs or similar devices. In addition, processing module/unit/logic 1528 may be implemented as firmware or functional circuitry within hardware devices. Further, processing module/unit/logic 1528 may be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for theft proofing an autonomous driving vehicle (ADV), the method comprising:
receiving, by a theft detection module from a plurality of sensors, sensor data of a moving object representing a person within a predetermined proximity of the ADV for transporting goods, wherein the sensor data includes a plurality of images of the moving object, and real-time weights and movements of the ADV;
determining a moving behavior of the moving object based on the sensor data in view of a set of known moving behaviors;
determining whether an intention of the person is likely to remove at least some of the goods from the ADV based on the moving behavior; and
sending an alarm to a predetermined destination in response to determining that the intention of the person is likely to remove the at least a portion of the goods from the ADV.

2. The computer-implemented method of claim 1, wherein the set of known moving behaviors are represented by a plurality of image sets stored in a database, each image set representing a known behavior performed by a person.

3. The computer-implemented method of claim 2, wherein the moving behavior of the moving object is determined based on a match between an image set in the sensor data and one of the plurality of image sets stored in the database.

4. The computer-implemented method of claim 1, wherein the intention of the person is determined based on a process derived from training historical image sets, wherein the historical image sets are classified into those representing theft behaviors and those representing non-theft behaviors.

5. The computer-implemented method of claim 4, wherein the intention of the person is further determined based on one or more of a plurality of other indicators, which include the person being in a blacklist, a weight loss of the ADV that exceeds a predetermined threshold, and an erratic movement of the ADV indicating that the ADV is likely to be taken away.

6. The computer-implemented method of claim 5, wherein the weight loss of the ADV is determined based on the real time weights of the ADV generated by a weighting machine installed in the ADV.

7. The computer-implemented method of claim 5, wherein the erratic movement of the ADV is determined based on the real time movements of the ADV generated by a movement sensor installed in the ADV.

8. The computer-implemented method of claim 5, wherein the blacklist represents a plurality of vehicle theft records stored in a database, each record including a face image of a person who commits the theft.

9. The computer-implemented method of claim 1, wherein the theft detection module includes a sensor data logger module configured to store the sensor data into a database, wherein the sensor data is sent to a machine learning engine, which uses the sensor data to optimize the process used to determine whether the intention of the person is likely to remove the at least a portion of the goods from the ADV.

10. A non-transitory machine-readable medium having instructions stored therein, which when executed by a processor, cause the processor to perform operations for theft proofing an autonomous driving vehicle (ADV), the operations comprising:
receiving, by a theft detection module from a plurality of sensors, sensor data of a moving object representing a person within a predetermined proximity of the ADV for transporting goods, wherein the sensor data includes a plurality of images of the moving object, and real time weights and movements of the ADV;

determining a moving behavior of the moving object based on the sensor data in view of a set of known moving behaviors;

determining whether an intention of the person is likely to remove at least some of the goods from the ADV based on the moving behavior; and sending an alarm to a predetermined destination in response to determining that the intention of the person is likely to remove the at least a portion of the goods from the ADV.

11. The non-transitory machine-readable medium of claim 10, wherein the set of known moving behaviors are represented by a plurality of image sets stored in a database, each image set representing a known behavior performed by a person.

12. The non-transitory machine-readable medium of claim 11, wherein the moving behavior of the moving object is determined based on a match between an image set in the sensor data and one of the plurality of image sets stored in the database.

13. The non-transitory machine-readable medium of claim 10, wherein the intention of the person is determined based on a process derived from training historical image sets, wherein the historical image sets are classified into those representing theft behaviors and those representing non-theft behaviors.

14. The non-transitory machine-readable medium of claim 13, wherein the intention of the person is further determined based on one or more of a plurality of other indicators, which include the person being in a blacklist, a weight loss of the ADV that exceeds a predetermined threshold, and an erratic movement of the ADV indicating that the ADV is likely to be taken away.

15. The non-transitory machine-readable medium of claim 14, wherein the weight loss of the ADV is determined based on the real time weights of the ADV generated by a weighting machine installed in the ADV.

16. The non-transitory machine-readable medium of claim 14, wherein the erratic movement of the ADV is determined based on by the real time movements of the ADV generated by a movement sensor installed in the ADV.

17. The non-transitory machine-readable medium of claim 14, wherein the blacklist represents a plurality of vehicle theft records stored in a database, each record including a face image of a person who commits the theft.

18. The non-transitory machine-readable medium of claim 10, wherein the theft detection module includes a sensor data logger module configured to store the sensor data into a database, wherein the sensor data is sent to a machine learning engine, which uses the sensor data to optimize the process used to determine whether the intention of the person is likely to remove the at least a portion of the goods from the ADV.

19. A system for theft proofing an autonomous driving vehicle (ADV), comprising:

a processor; and a memory coupled to the processor to store instructions, which when executed by the processor, cause the processor to perform the steps comprising receiving, by a theft detection module from a plurality of sensors, sensor data of a moving object representing a person within a predetermined proximity of the ADV for transporting goods, wherein the sensor data includes a plurality of images of the moving object, and real-time weights and movements of the ADV;

determining a moving behavior of the moving object based on the sensor data in view of a set of known moving behaviors;

determining whether an intention of the person is likely to remove at least some of the goods from the ADV based on the moving behavior; and sending an alarm to a predetermined destination in response to determining that the intention of the person is likely to remove the at least a portion of the goods from the ADV.

20. The system of claim 19, wherein the set of known moving behaviors are represented by a plurality of image sets stored in a database, each image set representing a known behavior performed by a person.

* * * * *